(12) United States Patent
Ray et al.

(10) Patent No.: US 7,103,662 B2
(45) Date of Patent: Sep. 5, 2006

(54) SYSTEM AND METHOD FOR IMPROVED SESSION MANAGEMENT IN A DATA CELLULAR NETWORK

(75) Inventors: Dipankar Ray, Plano, TX (US); Sonal Pauddar, Plano, TX (US); Pankaj Pobaru, Dallas, TX (US); John Curtin, Richardson, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 834 days.

(21) Appl. No.: 10/051,435

(22) Filed: Jan. 16, 2002

(65) Prior Publication Data

US 2003/0135626 A1    Jul. 17, 2003

(51) Int. Cl.
*G06F 15/173* (2006.01)
*H04Q 7/20* (2006.01)
*G06F 15/16* (2006.01)
*H04Q 7/00* (2006.01)

(52) U.S. Cl. ............... 709/225; 709/228; 455/432; 455/438; 370/328

(58) Field of Classification Search ............... None
See application file for complete search history.

(56) References Cited

U.S. PATENT DOCUMENTS

| | | |
|---|---|---|
| 2001/0023185 A1 | 9/2001 | Hakkinen et al. |
| 2001/0026541 A1 | 10/2001 | You et al. |
| 2001/0036834 A1 | 11/2001 | Das et al. |
| 2002/0068570 A1* | 6/2002 | Abrol et al. ............ 455/438 |
| 2002/0069278 A1* | 6/2002 | Forslow ............ 709/225 |
| 2002/0193110 A1* | 12/2002 | Julka et al. ............ 455/432 |
| 2002/0196749 A1* | 12/2002 | Eyuboglu et al. ............ 370/328 |

OTHER PUBLICATIONS

"Inter-Operability Specification (IOS) for High Rate Packet Data (HRPD) Access Network Interfaces; A.S0007-0 version 2.0 (TIA-878)" 3$^{RD}$ Generation Partnership Project 2 "3GPP2", Online Nov. 2001, XP00240734 Retrieved from the Internet: URL:http://www.3gpp2.com/Public_html/specs/index.cfm retrieved on May 7, 2003 paragraphs 1, 2, 1.3, 1.5.2, 2.4, 2.4.1, 2.4.2, 3.6, 3.6.1, 3.6.2.

(Continued)

*Primary Examiner*—Wen-Tai Lin
(74) *Attorney, Agent, or Firm*—Roger S. Burleigh

(57) ABSTRACT

A system and method is disclosed for improved session management when roaming between access networks (AN) within a data cellular network. In one embodiment, gateway functionality is added to one AN in each subnet. The Gateway AN (GAN) provides session transfer capabilities during a dormant handoff with a source AN located in a different subnet. The GAN is responsible for receiving session information request messages from target AN's within the local subnet, querying other GANs within other subnets to locate the subnet that contains the source AN for the session and routing the session information back to the target ANs. In another embodiment, an extended session is established across several ANs within a subnet. When an Access Terminal (AT) initiates a new extended session, the responsible AN negotiates a common session across the ANs covered by the extended session area. During the session negotiation, each AN establishes a new session and allocates a new Unicast Access Terminal Identifier (UATI). Each AN is notified of each UATI allocated for the extended session. Once the negotiation between ANs is completed, the AT can roam anywhere within the extended session area without re-negotiating the session or transferring session information.

22 Claims, 8 Drawing Sheets

OTHER PUBLICATIONS

P. De Silva et al.: "A Mobility Management Protocol for IP-Based Cellular Networks" Computer Communications and Networks, IEEE 10$^{TH}$ Int. Conf. on, (ICCN2001), Scottsdale Arizona (US), Online Oct. 15, 2001, pp. 476-482, XP002240735 Retrieved from the Internet: URL:http://www.elec.canterbury.ac.nz/research/networking/recent_publications.htm retrieved on May 9, 2003 Paragraphs 2.1 to 2.4.3.

C. Castellucia: "HMIPv6: A Hierarchical Mobile IPv6 Proposal" Mobile Computing and Communications Review; vol. 4, No. 1; ACM, New York (US), Jan. 2000, pp. 48-59, XP002240736 Paragraphs II to III.C.

"*1xEV-DO Inter-Operability Specification (IOS) for CDMA 2000 Access Network Interfaces*"; 3rd Generation Partnership Project 2 "3GPP2"; 3GGP2 A.S0007, Release 0, V&V Version; Apr. 25, 2001; pp. i-iv and 1-1 through E-2.

Ramin Rezaiifar; "*Proposed Baseline for C.S0024 Addendum*"; 3rd Generation Partnership Project 2 "3GPP2"; 3GGP2 C.S0024, Version 2.1; Aug. 24, 2001; pp. i-xlviii and 1-1 through 11-7.

* cited by examiner

SYSTEM AND METHOD FOR IMPROVED SESSION MANAGEMENT IN A DATA CELLULAR NETWORK

BACKGROUND OF THE INVENTION

1. Field of the Invention

The present invention relates generally to data cellular networks, and specifically to session management within data cellular networks.

2. Description of Related Art

High Rate Packet Data (HRPD) is a technology originally developed for dedicated packet data applications to meet the increasing demand for wireless Internet Protocol (IP) connectivity with high spectral efficiency. Voice transmissions require low data rates, but maintain stringent delay and jitter requirements. Packet data transmissions, on the other hand, typically require bursty high data rates, with less stringent delay and jitter requirements. The HRPD principle is to separate high-speed data completely from the voice network, so that the packet data requirements can be fulfilled optimally and independently.

In May 2000, the CDMA Development Group (CDG) accepted HRPD as the 1×Evaluation Phase One: Data Only (1×EV DO or 1×EV Phase 1), with minor requirements for improvements. Within the 1×EV DO cellular network, data-only (DO) mobile terminals, hereinafter referred to as Access Terminals (AT), utilize data services by initiating data sessions with data-only base stations, hereinafter referred to as Access Networks (AN). The AN's transmit and receive data packets to and from AT's over the air interface, and support packet data speeds above 144 kbps. It should be understood that the term AT as used herein refers to both DO terminals that utilize only data services and dual mode mobile terminals that are capable of utilizing both data services and voice services, but are currently operating in data mode.

To initiate a data session, an AT requests from a serving AN a Unicast Access Terminal Identifier (UATI) that uniquely identifies the AT within the serving AN. The UATI further includes an 8-bit field that identifies the Color Code of the AN within a Color Code Area or subnet. Each subnet includes up to 256 neighboring AN's that are allowed to transfer session information between each other. Upon receipt of the UATI, the AT engages in a session protocol negotiation process with the serving AN for the data session. The negotiated protocols and protocol configurations are stored within the AT and AN for later use in communications between the AT and the AN during the session. The UATI acts as a pointer to the session records within the AN.

After session configuration, the AT initiates Point-to-Point Protocol (PPP) and Link Control Protocol (LCP) negotiations for access authentication. Once authenticated, the data session begins with the AT in the dormant (i.e., idle) state. The AT can transition to the active state (e.g., engage in a packet data connection) at any time during the session. A session typically has a default duration of 54 hours. However, it should be understood that the session duration can vary depending upon the particular implementation.

Due to the extended session time, it is likely that a dormant AT may roam into another AN during the session. The new (target) AN uses the UATI Color Code to locate the original (source) AN. If the target AN is within the same subnet as the source AN, and the target AN is capable of supporting the session (e.g., protocol configurations are supported in the target AN), a dormant state handoff can be performed between the two ANs to transfer the session from the source AN to the target AN. Although the session protocol negotiation and terminal authentication operations do not need to be repeated during a dormant handoff, frequent dormant handoffs between AN's waste air link and network resources. In addition, the session transfer process could delay an active connection setup for the AT.

However, if the session is not supported in the target AN or if the target AN is located in a different subnet, the session must be re-negotiated over the air interface as if the original session never existed. For example, if an AT roams to a target AN that is not within the same subnet as the source AN, any attempted dormant handoff will fail since the correct source AN cannot be verified (i.e., the Color Code included in the previously assigned UATI is not recognized in the new subnet). Therefore, upon entering a new subnet, the AT must re-negotiate an entirely new session. The re-negotiation process causes additional delay and unnecessarily wastes air link and network resources. Therefore, what is needed is a session management procedure that enables seamless roaming between AN's.

SUMMARY OF THE INVENTION

The present invention provides a system and method for improved session management when roaming between access networks (AN) within a data cellular network. In one embodiment, gateway functionality is added to one AN in each subnet. The Gateway AN (GAN) provides session transfer capabilities during a dormant handoff with a source AN located in a different subnet. The GAN is responsible for receiving session information request messages from target AN's within the local subnet, querying other GANs within other subnets to locate the subnet that contains the source AN for the session and routing the session information back to the target ANs.

In an exemplary embodiment, to determine the GAN associated with the source AN, the GAN associated with the target AN can use location data (e.g., longitude and latitude information) associated with the source AN that is currently provided by the AT in the Route Update message sent with the UATI Request message. Alternatively, the AT can provide the Sector ID or Previous Access Network Identifier (PANID) associated with the source AN to the target AN. The GAN can maintain a table identifying GANs based on location data, the Sector ID or the PANID.

In another embodiment, an extended session is established across several ANs within a subnet. When the AT initiates a new extended session, the responsible AN negotiates a common session across the ANs covered by the extended session area. During the session negotiation, each AN establishes a new session and allocates a new UATI. Each AN is notified of each UATI allocated for the extended session. Once the negotiation between ANs is completed, the AT can roam anywhere within the extended session area without re-negotiating the session. In addition, no session information needs to be transferred between ANs within the extended session area.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
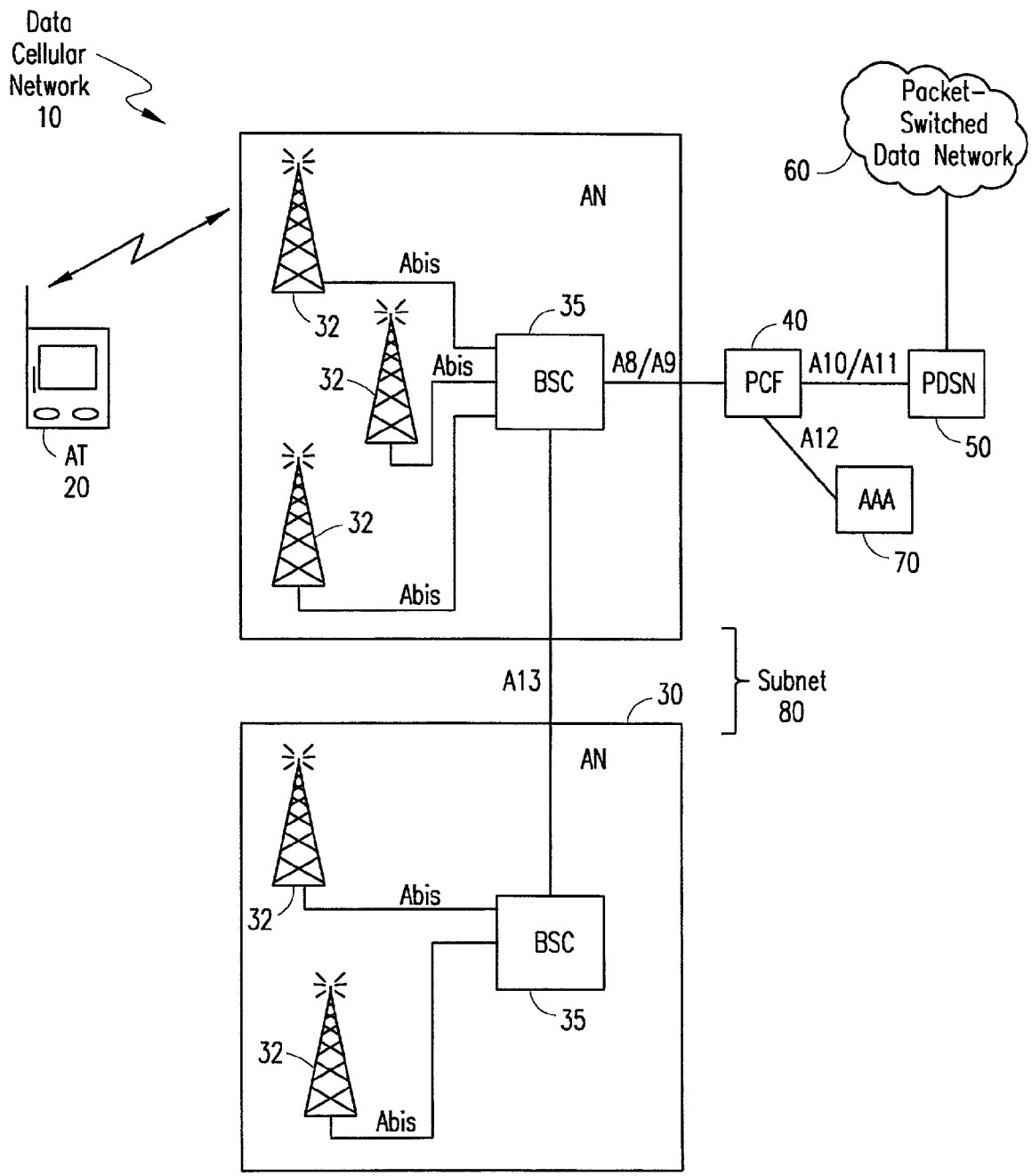
FIG. 1 is a block diagram illustrating a 1×EV DO cellular network.

FIG. 1 illustrates the basic architecture of a 1×EV DO cellular network 10. An Access Terminal (AT) 20 is in wireless communication with an Access Network (AN) 30 for data services. The AT 20 is a device providing data connectivity to a user. For example, an AT 20 may be connected to a computing device, such as a laptop personal computer, or the AT 20 may be a self-contained data device, such as a personal digital assistant, the latter being illustrated. The AN 30 is the network equipment that provides data connectivity between a packet switched data network 60 (e.g., the Internet or an Intranet) and the ATs 20.

For example, each AN 30 can include the equivalent of one or more Base Transceiver Stations (BTSs) 32 (e.g., the physical RF interface equipment) and a Base Station Controller (BSC) 35. Each BTS 32 provides a separate 1.25 MHZ data-only (DO) carrier for high rate packet data applications for each sector (or cell) served by the BTS 32. The BSC 35 is connected to each BTS 32 within the AN 30 via a respective Abis interface. In addition, the BSC 35 is responsible for operation, maintenance and administration of the BTSs 32 and handling the radio resources. It should be understood that the BSC 35 may be a separate node or may be co-located with one or more BTSs 32. All of the BSC's 35 within a subnet 80 (e.g., group of AN's 30) are connected together via respective A13 interfaces.

Packet data services are provided through a Packet Data Serving Node (PDSN) 50 that interfaces between the transmission of data in the packet switched data network 60, and the transmission of data over the air interface to/from the AT 20. Each PDSN 50 services a different subnet 80. The PDSN 50 interfaces with the AN 30 though a Packet Control Function (PCF) 40, which may or may not be co-located with the AN 30. The interface between the AN 30 and the PCF 40 is referred to as the A8/A9 interface, and the interface between the PCF 40 and the PDSN 50 is referred to as the A10/A11 interface. Access authentication of the AT 20 is performed by an Authentication, Authorization and Accounting (AAA) server 70 via an A12 interface between the PCF 40 and the AAA server 70.

In the 1×EV DO network, there are three packet data service states: Active/Connected, Dormant and Null/Inactive. In the Active/Connected state, a physical traffic channel exists between the AT 20 and the AN 30, and either node may send data. In the Dormant state, no physical traffic exists between the AT 20 and the AN 30, but a Point-to-Point Protocol (PPP) link is maintained between the AT 20 and the PDSN 50. In the Null/Inactive state, there is no physical traffic channel between the AT 20 and the AN 30 and no PPP link between the AT 20 and the PDSN 50. The A8 connection is maintained during the Active/Connected state and released during transition to the Dormant or Null/Inactive state, while the A10 connection is maintained during the Active/Connected state and the Dormant state.

As used herein, a data session refers to a shared state between the AT 20 and AN 30. This shared state stores the protocols and protocol configurations that are used for communication between the AT 20 and the AN 30 during the data session. The protocols and protocol configurations of the data session are negotiated between the AT 20 and AN 30 during initiation of the data session. A connection refers to a particular state of an air-link (e.g., a physical traffic channel being assigned or not assigned) between the AT 20 and AN 30. During a single data session, the AT 20 and the AN 30 can open and close a connection multiple times. A session typically has a default duration of 54 hours. However, it should be understood that the session duration can vary depending upon the particular implementation.

Figure 2:
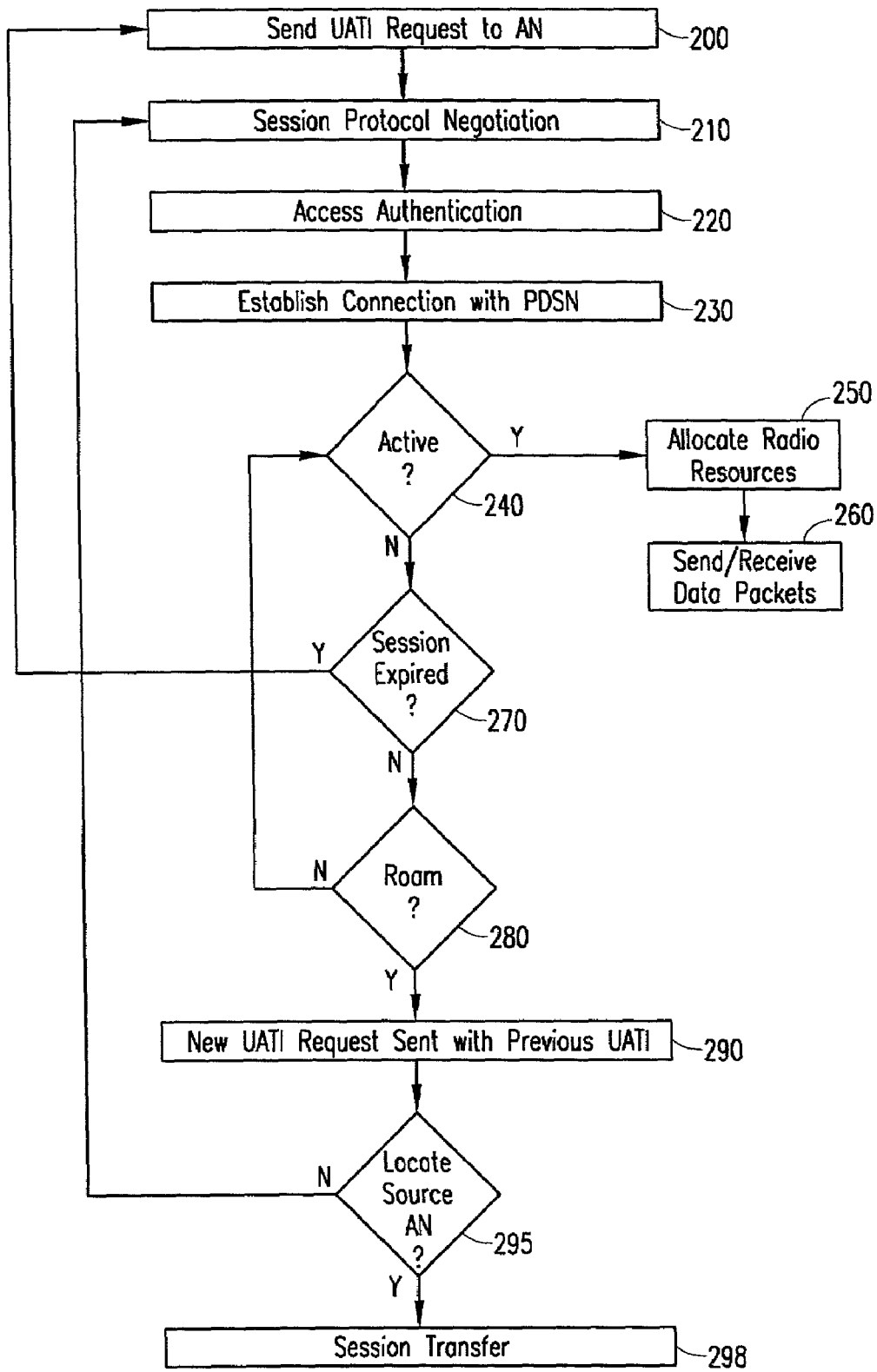
FIG. 2 is a flowchart illustrating the steps for initiating a data session within a 1×EV DO cellular network.

As shown in FIG. 2, to initiate a data session, an AT sends a Unicast Access Terminal Identifier (UATI) request to the AN (step 200). The UATI uniquely identifies the AT within the AN, and further includes an 8-bit field that identifies the Color Code of the AN within a Color Code Area or subnet. Each subnet includes up to 256 neighboring AN's that are allowed to transfer session information between each other. Upon receipt of the UATI, the AT engages in a session protocol negotiation and authentication process with the serving AN (steps 210 and 220). The session protocol negotiation process involves the negotiation of protocols and protocol configurations for a session associated with the AT, and the storage of the protocols and protocol configurations within the AT and AN for later use in communications between the AT and the AN during the session. The UATI acts as a pointer to the session records within the AN.

After session configuration, the AT initiates Point-to-Point Protocol (PPP) and Link Control Protocol (LCP) negotiations for access authentication. After authentication, the PCF initiates the setup of an A10 connection with the PDSN (step 230) while the AT is in a Dormant state. Therefore, after authentication, the AT can transition from the Dormant state to the Active/Connected state at any time during the session (step 240). For example, to transition to the Active/Connected state, the AT can send a connection request message to the AN, which in turn allocates radio resources (e.g., a physical traffic channel) to the AT (step 250) for use in sending/receiving data packets to/from the packet switched data network (step 260).

If during the session, a Dormant AT roams into an area served by a different AN (step 280) before the expiration of the data session (step 270), a new UATI request is sent to the AN (step 290). The new UATI request includes the old UATI assigned to the AT. If the new (target) AN is able to locate the original (source) AN using the UATI Color Code (step 295), the session may be able to be transferred from the source AN to the target AN using a session information request message from the source AN to the target AN (step 298). However, if the target AN is not able to locate the source AN, the session must be re-negotiated over the air interface as if the original session never existed (step 210). For example, if an AT roams to a target AN that is not within the same subnet as the source AN, any attempted dormant handoff will fail since the correct source AN cannot be verified (i.e., the Color Code included in the previously assigned UATI is not recognized in the new subnet). Therefore, upon entering a new subnet, the AT must re-negotiate an entirely new session.

Figure 3:
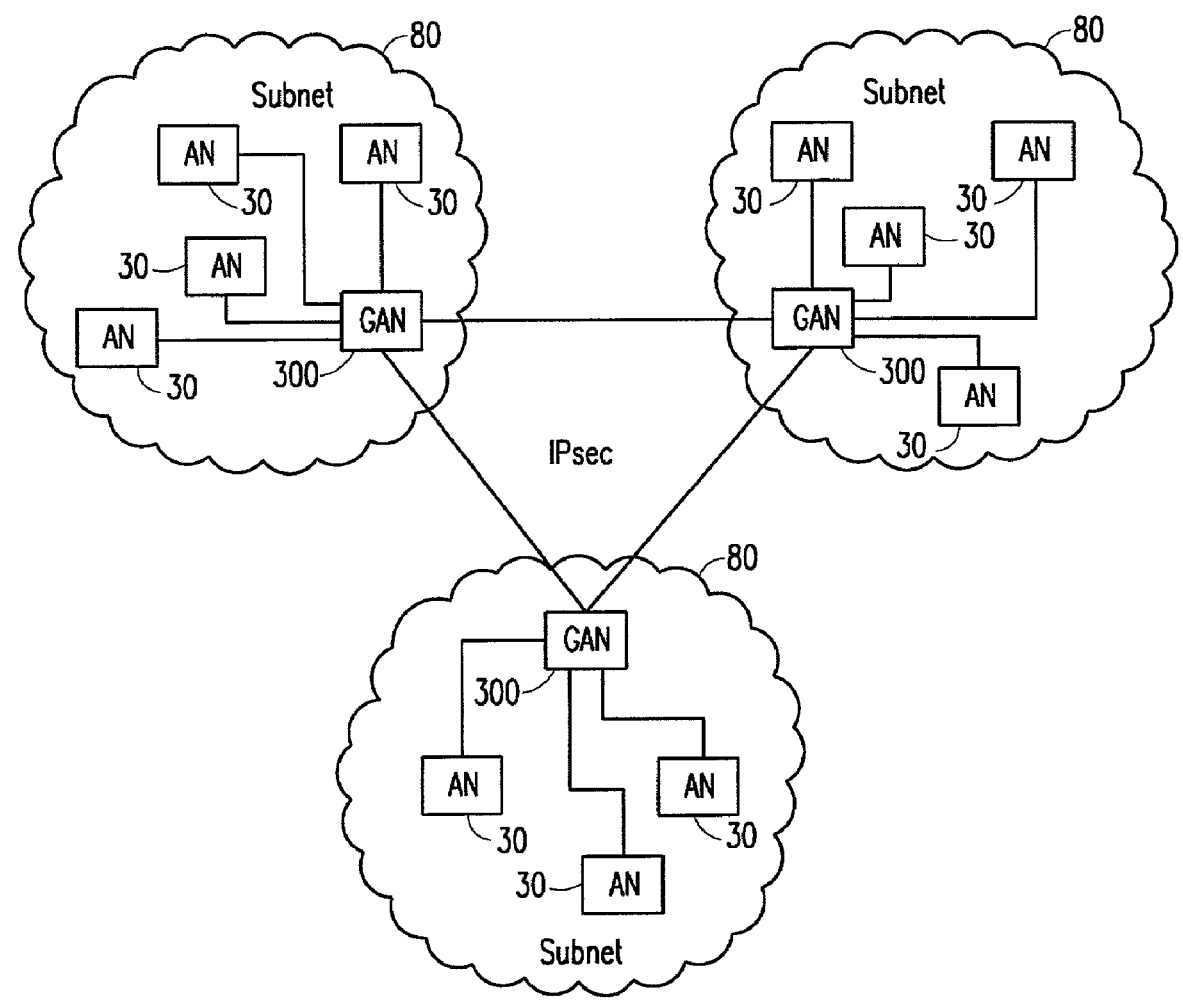
FIG. 3 is a block diagram illustrating exemplary gateway access network (GAN) functionality within a 1×EV DO cellular network, in accordance with embodiments of the present invention.

With reference now to FIG. 3 of the drawings, to avoid the delay involved in the re-negotiation process, gateway functionality can be added to one AN 30 in each subnet 80 (maximum of 256 ANs). The Gateway AN (GAN) 300 is contacted during a dormant handoff from a source AN 30 not able to be identified by the target AN 30 (e.g., a source AN 30 located in a different subnet 80). The target AN 30 directs session information request messages towards the GAN 300 when the source AN 30 is not available locally. Each GAN 300 is capable of querying other GANs 300 to locate the correct source AN 30 for the dormant handoff. For example, the IPsec protocol can be used to allow for GAN 300 interconnection between vendor networks and across significant geographical areas. In addition, each GAN 300 is capable of routing session information request messages towards the correct source AN 30, and routing received session information towards the target AN 30. Furthermore, each GAN 300 maintains information identifying source AN's 30 within the local subnet 80.

For example, in some embodiments, each GAN 300 is responsible for tracking the AN 30 and UATI mapping within the subnet 80 the GAN 300 represents. For example, if the previous UATI sent with the new UATI request message is used to determine the correct source AN 30, each GAN 300 is configured to map the currently assigned UATIs within the subnet 80 to the associated ANs 30. Each GAN 300 can maintain a list (not shown) of UATIs (including the Color Code Identities of the associated ANs 30) or, alternatively, each GAN 300 can query all ANs 30 within the subnet 80 to determine if a received UATI is associated with one of the ANs 30 within the subnet 80. It should be understood that although the Color Code Identity is used to identify the correct source AN 30 within the subnet 80, the 8-bit Color Code Identity field only provides 256 alternatives, and therefore, the Color Code Identities may be re-used between subnets 80. Thus, the complete UATI needs to be used to determine the correct source AN 30 located in a different subnet 80.

Figure 4:
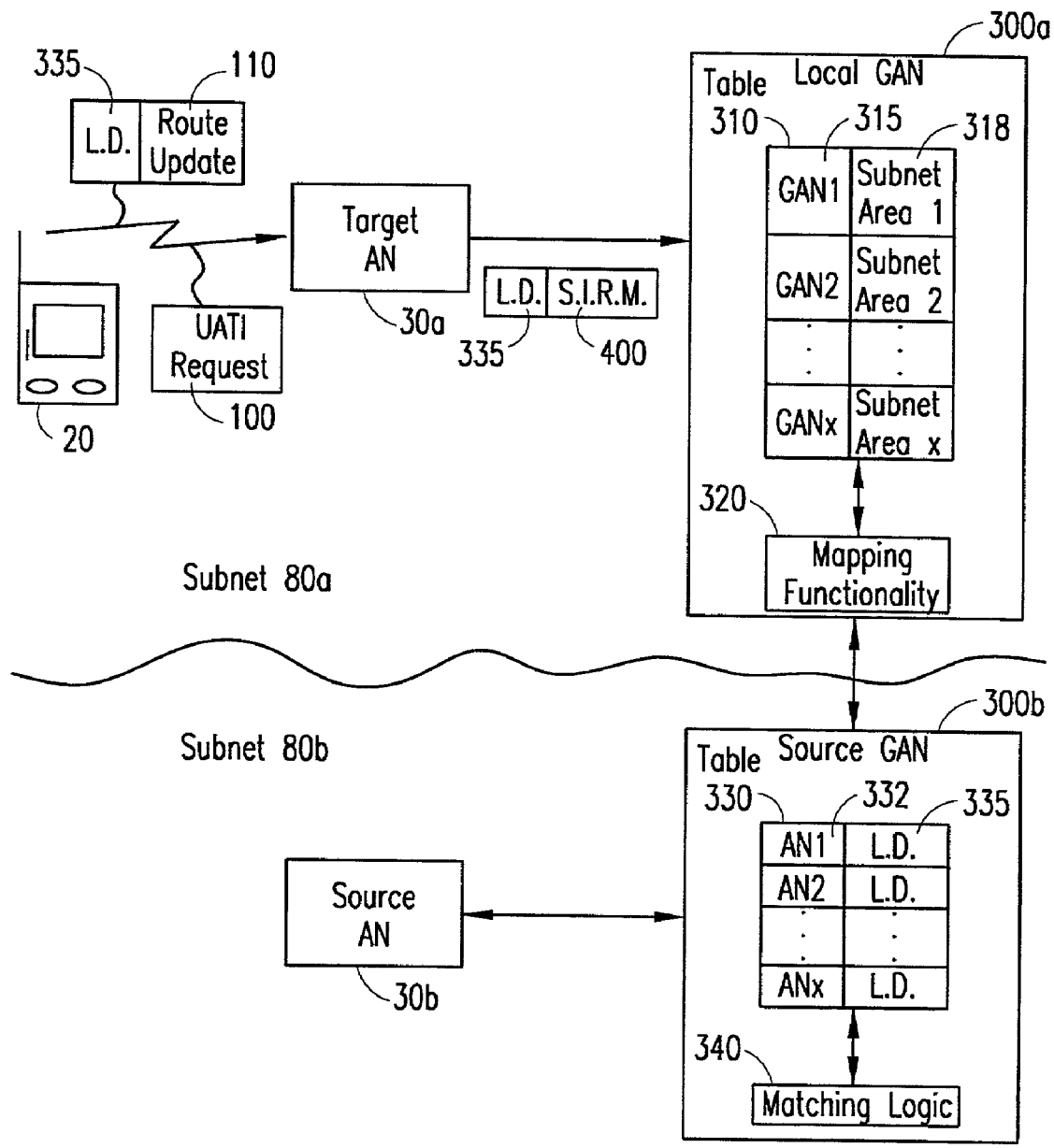
FIG. 4 is a functional block diagram illustrating GAN identification in accordance with exemplary embodiments of the present invention.

The source AN 30 can also be identified in at least two further ways. First, as shown in FIG. 4, the GAN 300 can use the existing location data 335 (e.g., latitude and longitude information) associated with the source AN 30*b* that is sent in the Route Update message 110 along with the UATI request message 100 from the AT 20 to the target AN 30*a*. The target AN 30*a* can include the location data 335 in the session information request message 400 to the local GAN 300*a* within the subnet 80*a*. The local GAN 300*a* can use the location data 335 in querying other GAN's 300*b* to determine which GAN 300*b* (subnet 80*b*) the source AN 30*b* belongs to. To determine the correct source AN 30*b*, the source GAN 300*b* includes a table 330 storing location data 335 associated with identities 332 of each of the AN's 30*b* within the local subnet 80*b* associated with the source GAN 300*b* and includes matching logic 340 for matching the received location data 335 with the stored location data 335. The matching logic 340 may be implemented as a combination of one or more of hardware, software and/or firmware.

In addition, as is shown in FIG. 4, the local GAN 300*a* can also maintain information identifying GANs 300*b* based on the location data 335. For example, the local GAN 300*a* can include a table 310 listing GAN identities 315 and associated subnet areas 318 (e.g., latitude and longitude coordinates of each AN 30*b* within the subnet 80*b* or other data identifying the geographical area that the subnet 80*b* covers). In addition, the local GAN 300*a* can include a mapping function 320 for mapping the received location data 335 with the associated subnet area 318. The mapping function 320 may be implemented as a combination of one or more of hardware, software and/or firmware. For example, the mapping function 320 can map the latitude and longitude coordinates of the source AN 30*b* to the geographical service area 318 of the associated subnet 80*b*, and use the table 310 to determine the identity 315 of the GAN 300*b* associated with the determined subnet 80*b*. Once determined, the local GAN 300*a* forwards the session information request message 400 including the location data 335 to the source GAN 300*b*. The source GAN 300*b* applies the matching logic 340 to the location data 335 to determine the identity 332 of the correct source AN 30*b* to retrieve the session information from for the data session.

Figure 5:
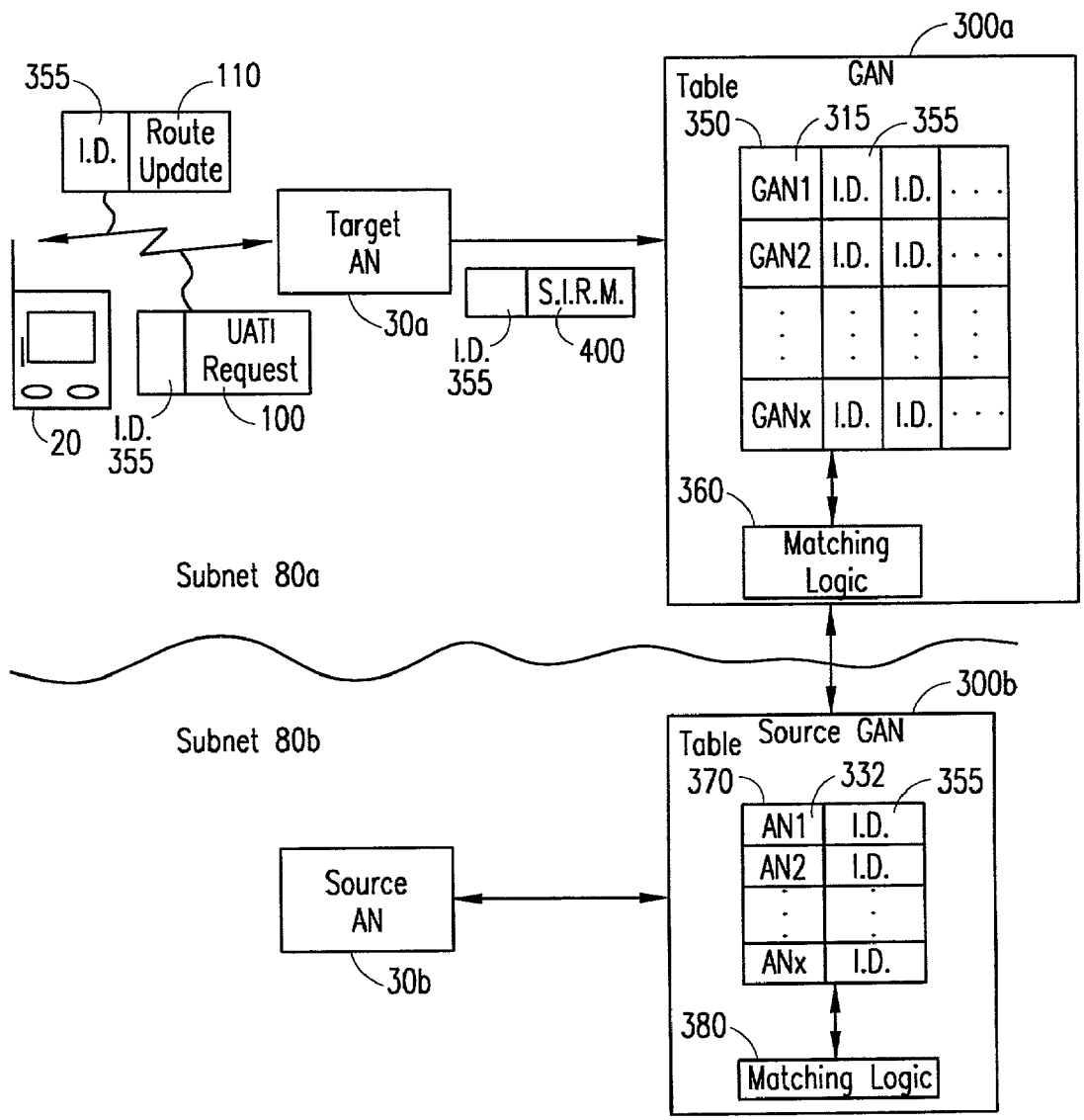
FIG. 5 is a functional block diagram illustrating GAN identification in accordance with alternative exemplary embodiments of the present invention.

In another embodiment, as shown in FIG. 5, the source AN 30*b* can be identified using an identifier 355 of the source AN 30*b*, such as the globally unique Sector ID or Previous Access Network Identifier (PANID) of the source AN 30*b*. As is understood in the art, a globally routable (IPv6) Sector ID is currently sent in the Sector Parameters message of the Overhead Messages Protocol from the source AN 30*b* to the AT 20. Therefore, the AT 20 has knowledge of the Sector ID of the source AN 30*b* and can add this Sector ID 355 to the UATI request message 100 or Route Update message 110 sent to the target AN 30*a*. Likewise, the AT 20 has knowledge of the PANID of the source AN 30*b*, and can add the PANID 355 to the UATI request message 100 or Route Update message 110 to the target AN 30*a*. Alternatively, the target AN 30*a* can request the Sector ID and/or PANID 355 from the AT 20 if the target AN 30 does not recognize the UATI Color Code sent in the UATI request message 100.

The target AN 30*a* can include the source AN identifier 355 in the session information request message 400 to the local GAN 300*a* within the subnet 80*a*. The local GAN 300*a* either uses the source AN identifier 355 in querying other GAN's 300*b* or maintains information identifying GANs based on the source AN identifier 355, the latter being illustrated. For example, the local GAN 300*a* can include a table 350 listing GAN identities 315 and associated source AN identifiers 355 and matching logic 360 for matching the received source AN identifier 355 with the stored source AN identifiers 355. The matching logic 360 may be implemented as a combination of one or more of hardware, software and/or firmware. The local GAN 300*a* forwards the session information request message 400 including the source AN identifier 355 to the source GAN 300*b*, which applies additional matching logic 380 to determine the identity 332 of the correct source AN 30*b* associated with the source AN identifier 355 to retrieve the session information from for the data session.

Figure 6:
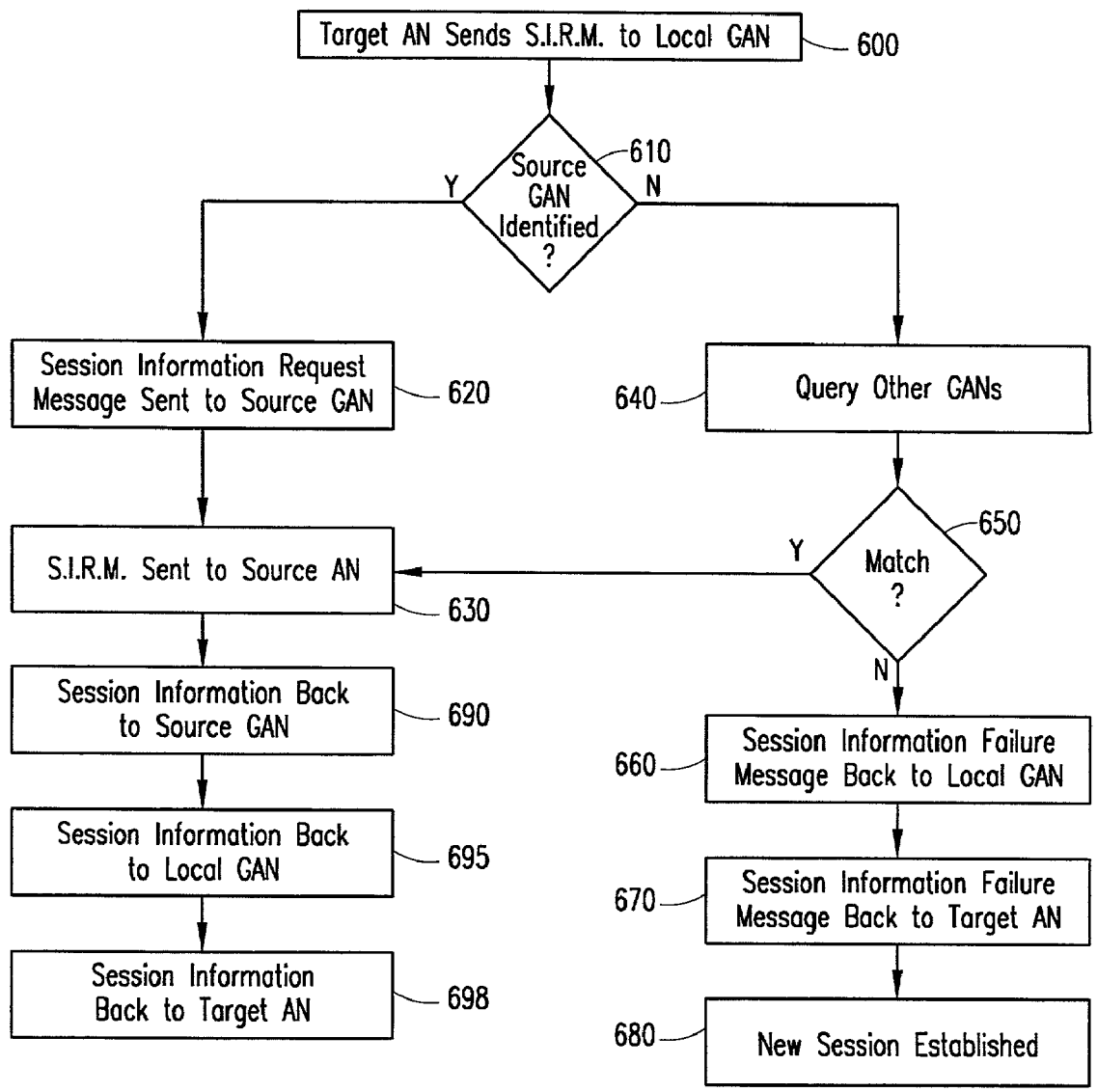
FIG. 6 is a flowchart illustrating the exemplary steps for performing an inter-subnet handoff in accordance with embodiments of the present invention.

Referring now to FIG. 6, when the target AN determines that the source AN cannot be identified within the local subnet, the target AN transmits a session information request message to the local GAN (step 600). The session information request message includes the previous UATI, source AN location data, the Sector ID of the source AN and/or the PANID of the source AN. If the local GAN is able to identify the GAN associated with the source GAN from the information sent with the session information request message (step 610), the local GAN forwards the session information request message to the appropriate GAN using any forwarding mechanism (step 620). For example, if the local GAN identifies the correct GAN using location data associated with the source AN, the local GAN can include the location data in the session information request message sent to the correct GAN. Alternatively, if the local GAN determines the correct GAN using either the Sector ID or the PANID, the local GAN can include the Sector ID or PANID in the session information request message and forward the session information request message to the correct GAN. Thereafter, the correct GAN uses the information (e.g., previous UATI, location data, Sector ID or PANID) included within the session information request message to identify the correct source AN to forward the session information request message to by mapping the information to the correct source AN or querying the source AN's with the information to determine the correct source AN (step 630).

However, if the local GAN cannot identify the correct GAN from information included in the session information request message (step 610), the local GAN queries other GANs to locate the subnet that contains the source AN (step 640). Other GAN's can be queried simultaneously or sequentially (the order can be determined based on a number of factors, such as the proximity to the target AN, etc.). For example, the local GAN can include the previous UATI, location data, Sector ID and/or PANID in the session information request message and forward the session information request message to one or more GAN's. Each GAN that receives the session information request message uses the information included in the session information request message to determine if the session belongs to one of the AN's within the subnet associated with the GAN. If there is a match (step 650), the GAN forwards the session information request message (with or without the added source AN identifying information) to the correct source AN (step 630). If a match is not found (step 650), a session information failure message is sent back to the GAN (step 660). If all queries resulted in a failure message, the local GAN transmits a session information failure message back to the target AN (step 670). Thereafter, a new session can be established between the AT and the target AN (step 680).

Once the correct source AN is determined and receives the session information request message (step 630), the correct source AN forwards the session information to the GAN within the subnet associated with the source AN (step 690). The GAN associated with the source AN, in turn, forwards the session information to the local GAN associated with the target AN (step 695). Thereafter, the local GAN for the subnet of the target AN forwards the session information back to the target AN for use in completing the dormant handoff (step 698).

Figure 7:
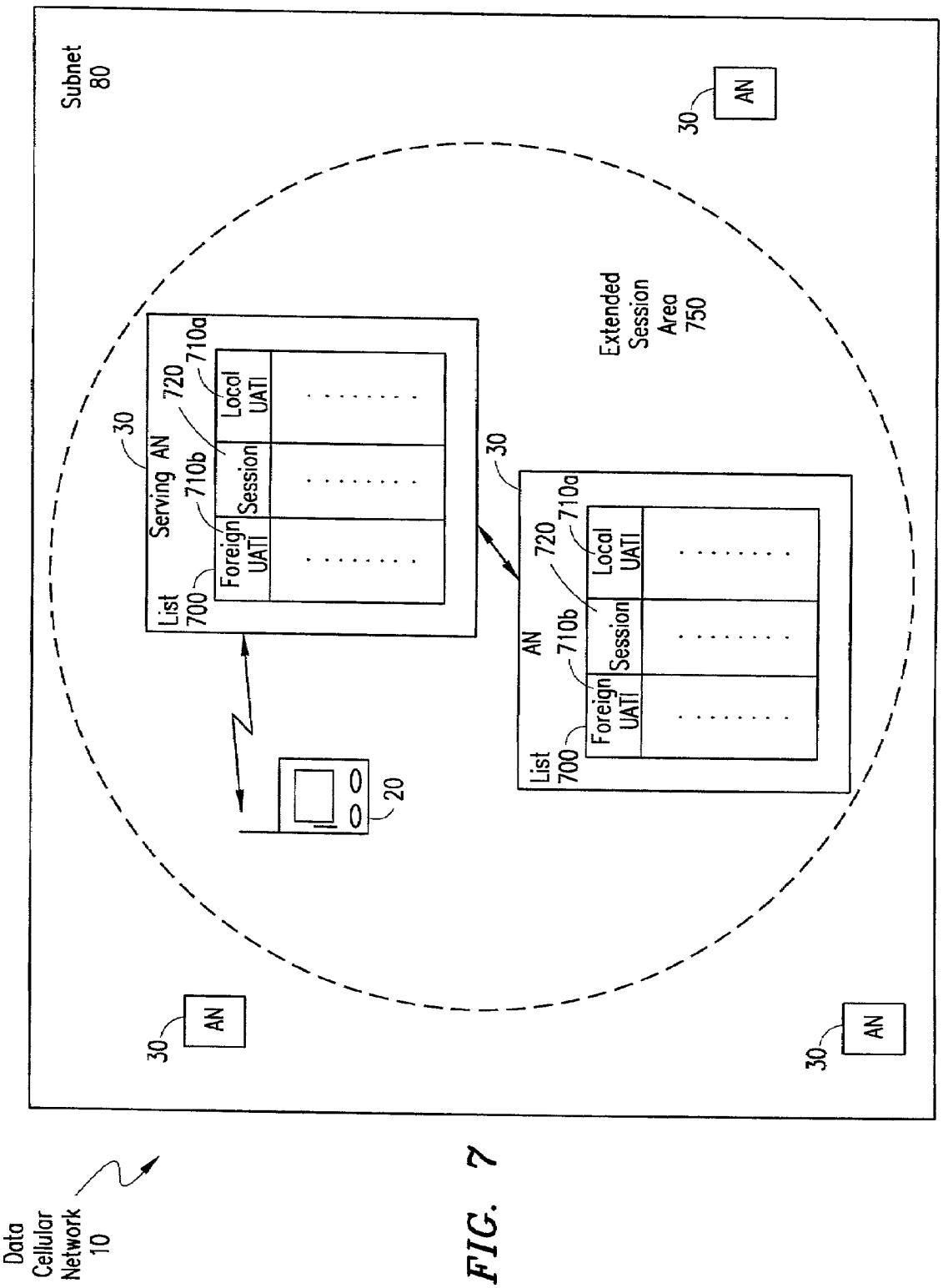
FIG. 7 is a block diagram illustrating an exemplary extended session architecture within a 1×EV DO cellular network in accordance with embodiments of the present invention.

With reference now to FIG. 7, as a further enhancement to session management when roaming between AN's 30 within a data cellular network 10, the concept of an "extended session" can be applied to avoid session information transfers between AN's 30 during dormant handoffs. An extended session is a session established across two or more ANs 30 that are located within an extended session area 750 within a particular subnet 80. During the initial session configuration process for an AT 20, the serving AN 30 negotiates a common session across the ANs 30 covered by the extended session area 750. Each AN 30 within the extended session area 750 assigns the AT 20 a UATI 710, and all of the AN's 20 store all of the assigned UATI's 710 for the AT 30.

For example, each AN 30 can include an extended session list 700 (or table) that includes a list of each foreign UATI 710*b* (i.e., UATI's assigned by other AN's) assigned to each AT 20 having an extended session. Each foreign UATI 710*b* points to an associated session 720 and local UATI 710*a* assigned to the session 720 by the local AN 30. In addition, each foreign UATI 710*b* identifies the AN 30 associated with the foreign UATI 710*b* by the Color Code field of the foreign UATI 710*b*. Therefore, during a handoff to a target AN 30 within the extended session area 750, the target AN 30 can match the old UATI 710*b* associated with the source AN 30 with the assigned UATI 710*a* for the AT 20 for the target AN 30 and continue the session 720 for the AT 20 without requesting any session information from the source AN 30 or re-negotiating the session 720 with the AT 20.

In one embodiment, the extended session area 750 can be defined by the network operator. For example, the network operator can define an extended session area 750 to include two or more ANs 30 that ATs 20 frequently roam between. The extended session area 750 defined by the network operator can be applied to all ATs 20 that enter the area 750, or to only certain mobile subscribers that frequently roam in the extended session area 750. In another embodiment, the extended session area 750 can be defined by the mobile subscriber to include two or more ANs 30 that the mobile subscriber frequently roams between. For example, a company can define an extended session area 750 for one or more employees that frequently roam between two or more ATs 20. In a further embodiment, the extended session area 750 can be defined based on the current location of the AT 20. For example, the network can define the session area 750 to include two or more ANs 30 within a certain distance (or radius) from the AT 20 (determined from the location of the serving AN 30, the location of the serving cell, the location estimate of the AT 20 as determined by the network or a GPS system, etc.). Although specific examples have been listed, it should be understood that the extended session area 750 can be determined in any manner feasible, and is not limited to the above-listed examples.

Figure 8:
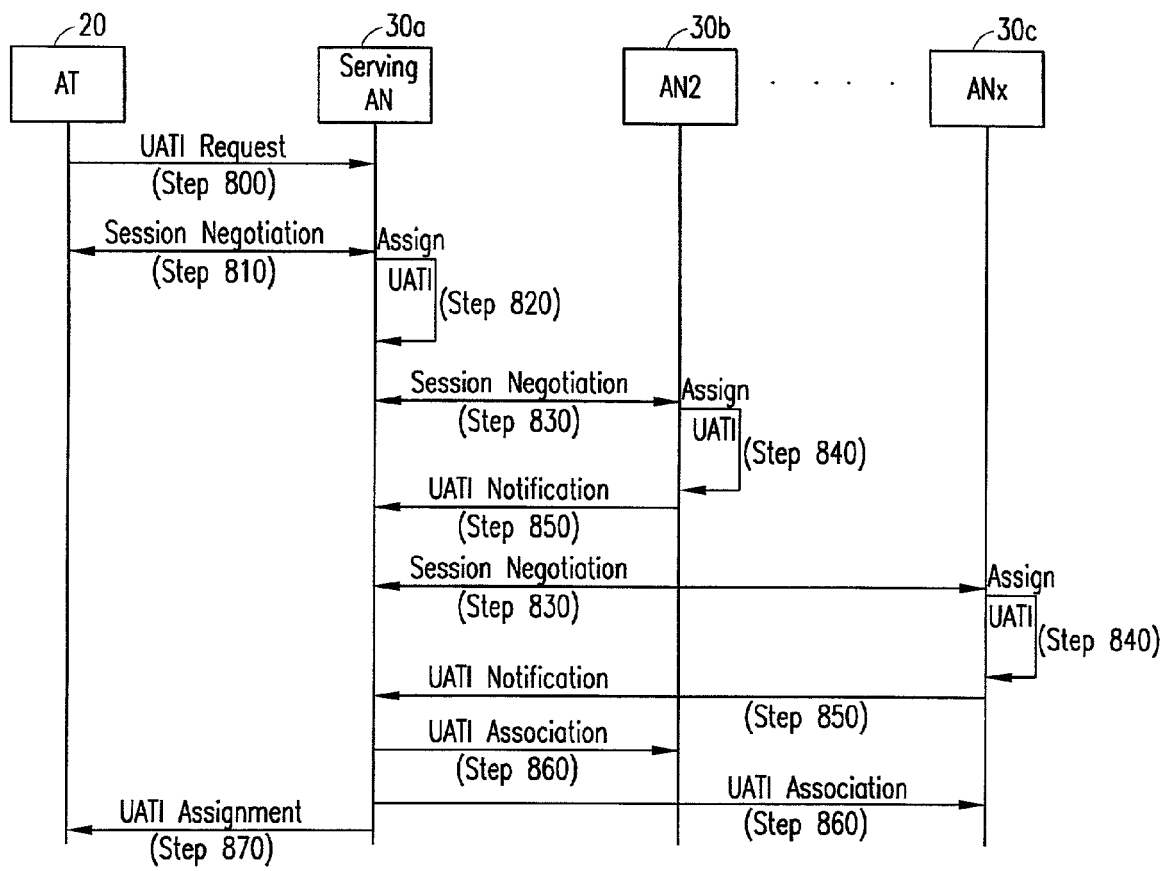
FIG. 8 is a flow diagram illustrating exemplary signaling for an extended session negotiation process in accordance with embodiments of the present invention.

The extended session establishment process is illustrated in more detail in the exemplary signaling diagram shown in FIG. 8. When the AT 20 initiates a new extended session, the AT 20 sends a UATI request message to the serving AN 30*a* (step 800). In response, the serving AN 30*a* negotiates a data session with the AT 20 (step 810) and assigns a UATI to the AT 20 for the data session (step 820). Thereafter, the serving AN 30*a* negotiates a common session across the ANs 30*b* and 30*c* covered by the extended session area (steps 830). The session negotiation process (steps 830) involves the negotiation of protocols and protocol configurations between the AT 20 and the serving AN 30*a* and between the serving AN 30*a* and other AN's 30*b* and 30*c* within the extended session area. For example, the serving AN 30*a* can use the protocols and protocol configurations provided to the serving AN 30a from the AT 20 in negotiating the protocols and protocol configurations with the other AN's 30b and 30c.

Upon completion of the extended session negotiation (steps 830), each AN 30b and 30c assigns a UATI to the AT 20 and stores the negotiated protocols and protocol configurations within a session record for the AT 20 (steps 840). As mentioned above, each assigned UATI acts as a pointer to the session records within the associated AN 30a–c. Each extended session AN 30b and 30c passes back to the serving AN 30a the assigned UATI (steps 850), and the serving AN 30a transmits all of the assigned UATI's to each of the extended session AN's 30b and 30c for storage within their extended session lists (steps 860). Thereafter, the serving AN 30a continues with the session establishment by passing the UATI assigned to the AT 20 by the serving AN 30a back to the AT 20 for use by the AT 20 in communicating with the serving AN 30a during the session (step 870).

Figure 9:
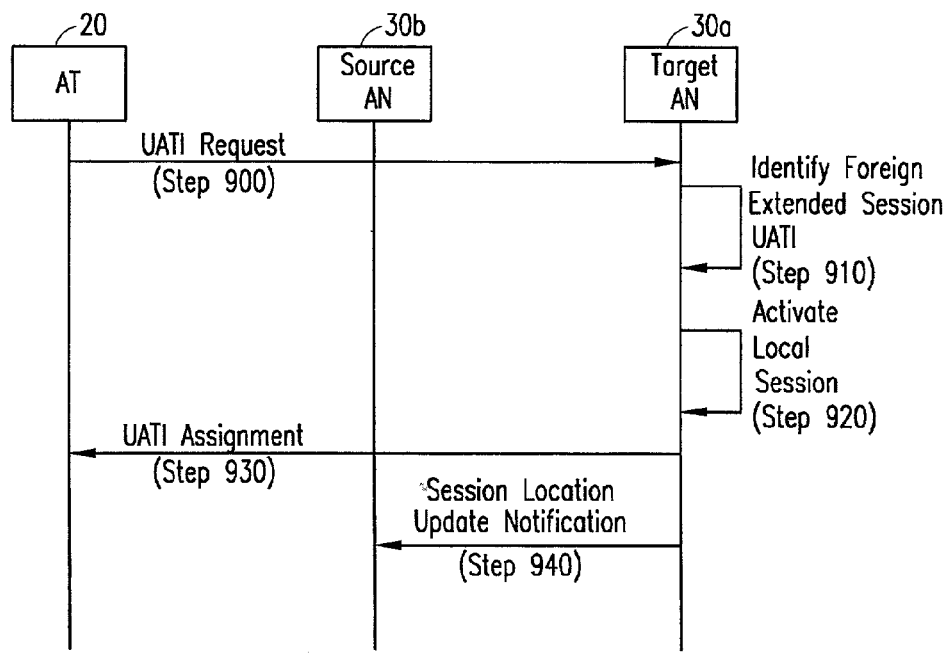
FIG. 9 is a flow diagram illustrating exemplary signaling for an extended session handoff in accordance with embodiments of the present invention.

Referring now to FIG. 9, if the AT 20 roams into an area served by a target AN 30b within the extended session area, the AT 20 sends a UATI request message to the new (target) AN 30a (step 900). The target AN 30a receiving the UATI request message reads the previous UATI from the UATI request message and searches the extended session list for the previous UATI (step 910). The matching entry in the extended session list indicates the session established and the UATI allocated by the target AN for the session. The local session for the determined local UATI is activated (step 920) and the local UATI is used to proceed with UATI Assignment (step 930). Thereafter, the target AN 30a sends a session location update notification to the source AN 30b (step 940), causing the session to become inactive (but not closed) in the source AN 30b. The result is a dormant AN-AN handoff without any session establishment or re-negotiation, thereby eliminating the need for protocol re-negotiation during an inter-AN dormant handoff and reducing the delay of session establishment when roaming between ANs.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for improved session management within a data cellular network, comprising:
   a gateway one of a plurality of access networks, each of the plurality of access networks being capable of being in wireless communication with a plurality of access terminals to provide data connectivity between a packet switched data network and the plurality of access terminals during respective data sessions associated with the plurality of access terminals, said gateway access network serving a first subnet of the plurality of access networks and further comprising:
      means for receiving a session information request message from a target one of the plurality of access networks within the first subnet, the session information request message being sent to complete a dormant handoff of an ongoing one of the data sessions to the target access network;
      means for determining a second subnet that contains a source one of the plurality of access networks associated with the ongoing data session; and
      means for routing session information associated with the ongoing data session from the source access network to the target access network;
   wherein the session information request message includes location data associated with the source access network, and wherein said means for determining further comprises:
      means for identifying an additional gateway access network within the second subnet based on the location data; and,
   wherein said means for identifying further comprises:
   means for associating subnet geographical areas and gateway access network identities; and
      means for mapping the location data to one of the subnet geographical areas.

2. The system of claim 1, wherein said gateway access network further comprises:
   means for receiving an additional session information request message including at least a previous Unicast Access Terminal Identifier assigned by an additional source access network within the first subnet to an additional ongoing data session.

3. The system of claim 2, wherein said gateway access network further comprises:
   a list of currently assigned Unicast Access Terminal Identifiers within the first subnet, each of the Unicast Access Terminal Identifiers including a field identifying an associated one of the plurality of access terminals within the first subnet that assigned the respective one of the Unicast Access Terminal Identifiers; and
   means for matching the received previous Unicast Access Terminal Identifier with one of the currently assigned Unicast Access Terminal Identifiers within the list to determine the additional source access network.

4. The system of claim 2, wherein said gateway access network further comprises:
   means for querying each of the plurality of access networks within the first subnet with the previous Unicast Access Terminal Identifier to determine the additional source access network.

5. The system of claim 1, wherein the target access network receives the location data in a Route Update message and sends the session information request message including the location data to said gateway access network.

6. The system of claim 1, wherein said gateway access network further comprises:
   means for receiving an additional session information request message including location data associated with an additional source access network within the first subnet for an additional ongoing data session; and
   means for matching the received location data to the identity of the additional source network.

7. The system of claim 1, wherein the session information request message includes an identifier of the source access network, and wherein said means for determining further comprises:
   means for identifying an additional gateway access network within the second subnet using the received identifier of the source access network.

8. The system of claim 7, wherein said means for identifying comprises:
   a table listing gateway access network identities and associated source access network identities; and
   means for matching the received identifier of the source access network to one of the source access network identities to determine the associated gateway access network identity of the additional gateway access network.

9. The system of claim 8, wherein the target access network receives the identifier of the source access network in a Route Update message or a Unicast Access Terminal Identifier request message and sends the session information request message including the identifier of the source access network to said gateway access network.

10. The system of claim 1, wherein said gateway access network further comprises:
means for receiving an additional session information request message including an identifier associated with an additional source access network within the first subnet for an additional ongoing data session; and
means for matching the received identifier to the identity of the additional source network.

11. The system of claim 1, further comprising:
an additional gateway one of the plurality of access networks within the second subnet, said additional gateway access network being configured to receive the session information request message from said gateway access network within the first subnet, retrieve the session information from the source access network and transmit the session information to said gateway access network within the first subnet.

12. The system of claim 11, wherein said additional gateway access network within the second subnet and said gateway access network within the first subnet communicate using the IPsec protocol.

13. A method for improved session management within a data cellular network having a plurality of access networks, each of the plurality of access networks being capable of being in wireless communication with a plurality of access terminals to provide data connectivity between a packet switched data network and the plurality of access terminals during respective data sessions associated with the plurality of access terminals, said comprising the steps of:
receiving a session information request message at a gateway one of the plurality of access networks serving a first subnet of the plurality of access networks from a target one of the plurality of access networks within the first subnet, the session information request message being sent to complete a dormant handoff of an ongoing one of the data sessions to the target access network;
determining a second subnet that contains a source one of the plurality of access networks associated with the ongoing data session; and
routing session information associated with the ongoing data session from the source access network to the target access network;
wherein the session information request message includes location data associated with the source access network, and wherein said step of determining further comprises the step of:
identifying an additional gateway access network within the second subnet based on the location data; and,
wherein said step of identifying further comprises the steps of:
associating subnet geographical areas and gateway access network identities; and
mapping the location data to one of the subnet geographical areas.

14. The method of claim 13, further comprising the step of:
receiving an additional session information request message including at least a previous Unicast Access Terminal Identifier assigned by an additional source access network within the first subnet to an additional ongoing data session.

15. The method of claim 14, further comprising the step of:
matching the received previous Unicast Access Terminal Identifier with one of a plurality of currently assigned Unicast Access Terminal Identifiers within a list of currently assigned Unicast Access Terminal Identifiers within the first subnet to determine the additional source access network, each of the Unicast Access Terminal Identifiers including a field identifying an associated one of the plurality of access terminals within the first subnet that assigned the respective one of the Unicast Access Terminal Identifiers.

16. The method of claim 14, further comprising the step of:
querying each of the plurality of access networks within the first subnet with the previous Unicast Access Terminal Identifier to determine the additional source access network.

17. The method of claim 13, further comprising the steps of:
receiving the location data at the target access network in a Route Update message; and
sending the session information request message including the location data from the target access network to said gateway access network.

18. The method of claim 13, further comprising the steps of:
receiving an additional session information request message including location data associated with an additional source access network within the first subnet for an additional ongoing data session; and
matching the received location data to the identity of the additional source network.

19. The method of claim 13, wherein the session information request message includes an identifier of the source access network, and wherein said step of determining further comprises the step of:
identifying an additional gateway access network within the second subnet using the received identifier of the source access network.

20. The method of claim 19, wherein said step of identifying further comprises the step of:
matching the received identifier of the source access network to one of a plurality of source access network identities listed in a table associating gateway access network identities and source access network identities to determine the associated gateway access network identity of the additional gateway access network.

21. The method of claim 20, further comprising the steps of:
receiving the identifier of the source access network at the target access network in a Route Update message or a Unicast Access Terminal Identifier request message; and
sending the session information request message including the identifier of the source access network to said gateway access network.

22. The method of claim 13, further comprising the steps of:
receiving an additional session information request message including an identifier associated with an additional source access network within the first subnet for an additional ongoing data session; and matching the received identifier to the identity of the additional source access network.

* * * * *